United States Patent [19]

Klötzner

[11] E Patent Number: Re. 31,997

[45] Reissued Date of Patent: Oct. 1, 1985

[54] INPUT-OUTPUT UNIT FOR A MICROPROCESSOR ENGINE CONTROL SYSTEM

[75] Inventor: Winfried Klötzner, Maulbronn-Schmie, Fed. Rep. of Germany

[73] Assignee: Robert Bosch GmbH, Stuttgart, Fed. Rep. of Germany

[21] Appl. No.: 380,340

[22] Filed: May 20, 1982

Related U.S. Patent Documents

Reissue of:

[64] Patent No.: 4,204,256
Issued: May 20, 1980
Appl. No.: 916,827
Filed: Jun. 19, 1978

[30] Foreign Application Priority Data

Jul. 20, 1977 [DE] Fed. Rep. of Germany ..... 2732781

[51] Int. Cl.[4] ..... G06F 15/20; G05B 15/02; F02D 5/02

[52] U.S. Cl. ..... 364/431.12; 123/417; 123/480

[58] Field of Search ..... 364/200, 900, 424, 431.04, 364/431.05, 431.12; 123/416, 417, 480, 486

[56] References Cited

U.S. PATENT DOCUMENTS

| | | | |
|---|---|---|---|
| 3,875,564 | 4/1975 | Thuruoka et al. | 364/900 |
| 4,003,033 | 1/1977 | O'Keefe et al. | 364/200 |
| 4,009,699 | 3/1977 | Hetzler et al. | 364/431.04 X |
| 4,060,714 | 11/1977 | Lappington et al. | 364/431.04 |
| 4,063,539 | 12/1977 | Gorille et al. | 123/416 |
| 4,082,069 | 4/1978 | Mayer | 123/416 |
| 4,099,495 | 7/1978 | Kiencke et al. | 123/480 |
| 4,140,087 | 2/1979 | Daumer et al. | 364/431.12 X |
| 4,199,812 | 4/1980 | Klötzner | 364/431.04 |
| 4,276,602 | 6/1981 | Obara et al. | 364/431.12 |

FOREIGN PATENT DOCUMENTS

| | | | |
|---|---|---|---|
| 2551639 | 6/1977 | Fed. Rep. of Germany | 364/431 |

*Primary Examiner*—Felix D. Gruber
*Attorney, Agent, or Firm*—Frishauf, Holtz, Goodman & Woodward

[57] ABSTRACT

Repetitive operations, such as fuel injection and/or ignition timing of a gasoline engine, are controlled by a microprocessor with reference to engine operation parameters that provide electrical inputs in a manner achieving increased efficiency and economy by the provision of an input-output unit that supplies considerable preprocessing of the input signals under control of the microprocessor through the usual data and address buses. Counters are operated to count down from count limit values. The counting rate, as well as the count limit values, are capable of being varied by commands through the data bus, from time to time, so as to make the capabilities of the system adaptable to a wide variety of particular engines. The system is readily programmable for a particular application or machine if a programmable read-only memory (PROM or EPROM) is used for programming the microprocessor.

19 Claims, 7 Drawing Figures

12
ROM
11
RAM
10
μP
13
29
37
370
371
372
373
374
U
T
α

INPUT-OUTPUT UNIT FOR A MICROPROCESSOR ENGINE CONTROL SYSTEM

Matter enclosed in heavy brackets [ ] appears in the original patent but forms no part of this reissue specification; matter printed in italics indicates the additions made by reissue.

The invention concerns an input-output unit in a system for controlling repetitive operations of a machine in accordance with operating parameters, where the system is of a kind that utilizes an electronic microprocessor. In particular the invention concerns an input-output unit in a system for controlling the ignition in a vehicular internal combustion engine.

Control systems for engine ignition and the like in motor vehicles are well known from, for example, the following references:

Electronics, Jan. 20, 1977, page 102 ff.
Electronic Design, Jan. 4, 1977, No. 1, page 34 ff.;
Electronik, 1977, Heft 4, page 48 ff.;
SAE Paper No. 750,432, application of micro-Processors to the Automobile, page 65 ff.;
etz-b, Volume 28, 1976, Heft 15, page 496 ff.;
Computer, August, 1974, page 33 ff.

Hard-wired computers for control of processes in motor vehicles, particularly in their internal combustion engines, are known, for example, from German published patent application (OS) 2 504 843 (corresponding to U.S. patent apllication Ser. No. 650,971 filed Jan. 21, 1976, now U.S. Pat. No. 4,063,539, assigned to the assignee of this application). Such a hardwired computer has the disadvantage compared to a microprocessor system that it has poorer variability, whereas the known microprocessor systems must carry out more or less pedestrian and therefore slow computing operations because of their dependence upon the necessary input-output unit and upon the necessary stored values in a fixed memory, so that lengthy programs are necessary to prepare and operate upon the signals applied externally. In consequence there are limitations at the cost of calculation accuracy, particularly at higher speeds.

It is an object of the present invention to provide a microprocessor control system for repetitive operations of a machine, for example, for the ignition timing in an internal combustion engine, that is not subject to the limitations of the heretofore known system and, in particular, to provide an input-output unit for such a system that will make possible the operation of the control system on an economical basis with high accuracy and high speed because of the simpler handling of the quantities and computations.

SUMMARY OF THE INVENTION

Briefly, an input-output unit for such a system utilizes a counter connected to the data bus of the system for counting signals representative of shaft rotation rate and is arranged for operation in successive counting intervals, the length of which intervals are determined by setting through the data bus a count value to be counted by the counter and the position in time of each such interval is subject to control by timing the activation of the counter with reference to at least one timing reference mark of the engine or of the machine. In addition, the input-output unit includes a comparator and a buffer store for it, the comparator having one input connected to the counter and the other to the buffer store, which is arranged to have its contents written through the data bus. The input-ouput unit also contains a selectable final stage array having two or more output command channels and select logic circuits are provided for the final stage array for operation through the data bus for preselection of the channels of the final stage array. These channels can be, for example, the ignition timing circuit of separate cylinders or pairs of cylinders of an internal combustion engine.

Such an arrangement has the advantage that, by extensive preparation and interrelation of the externally provided control signals in the input-output unit, a quick processing of the externally applied information to produce switching commands is made possible, the preprocessing and correlation being controlled by the microprocessor through the data bus and the address bus of the system. The system so organized is thereby highly versatile and easily fitted to different types of internal combustion engines and of microprocessors. This input-output unit is easily integrated into a system and makes possible the program-controlled running of various counting processes for which the microprocessors currently available are not yet really suitable. Furthermore, the storage of switching signals makes it possible to provide information currently concerning the operating condition of the motor. As needed these stored values can be interrogated.

It is particularly convenient to combine the timing provided by the timing reference mark, above mentioned, in an OR-gate with the overflow signal of the counter to produce additional internal timing references. For this purpose, it is useful to provide a frequency multiplying stage interposed in the counting input of the counter. It is also advantageous to provide at least one additional magnitude dependent upon an operating parameter in the form of a frequency (in addition to the shaft speed magnitude) to a second counter of which the counting time is determined by a digital timing circuit and the counting result is transferable through a gate stage into the data bus.

The additional counter can usefully be made to handle two or more magnitudes dependent upon operating parameters, by means of a transfer switch device through which the magnitudes are made available to the counter, the transfer switch device being controllable by a decoder stage controlled through the data bus. The digital timing circuit preferably contains a third counter for counting a counting frequency and receives a count content to be counted down from the data bus. The counting frequency of the third counter can conveniently be varied through the data bus.

Another useful adjunct to the system is a stage that recognizes when the engine speed falls below a predetermined limit and on such occasions provides a signal to the data bus for shutting off the quiescent current of the final stage array. This speed recognition stage is preferably constituted as a counter that counts a counting frequency in successive counting intervals the beginning of which is determined by speed signals. When a predetermined counter content is reached, a signal can be produced indicating the limit speed. The limit speed can be made variable by variably setting the counter over the data bus. The counting frequency can also be varied by a command over the data bus. In the case of the second and the third counter, it is particularly useful to provide a frequency division stage operating at a basic counting frequency and having two or more output frequencies which are selectable through a transfer switching arrangement controlled over the data bus, preferably by a suitable decoder stage.

In such a system it is also useful to provide a reset command decoder connected with the data bus controlled by data supplied either internally or externally of the input-output unit for resetting report-back information. For the purposes of the invention, this is regarded as part of the input-output unit. At least one input of such a back-check unit is preferably provided with a buffer store. The back-check unit also consists of at least one transmission gate and preferably has one input connected to a signal controlled by a switch, for example, a manually operable switch.

In the systems of the present invention, a decoding stage addressable over the address bus is preferably provided for stepwise control of the components connected to the data bus, and, again, for the purpose of the present invention, such a decoding component is regarded as an element of the input-output unit.

The above-described use of a timing circuit as a counter in the input-output unit for counting a counting frequency, with the count from which counting down should be done being provided through the data bus, is particularly useful. Different operating states of the timing circuit can be set and interrogated easily over the data bus.

THE DRAWINGS

The invention is further described by way of example with reference to the annexed drawings, in which.

DESCRIPTION OF THE PREFERRED EMBODIMENT

Figure 1:
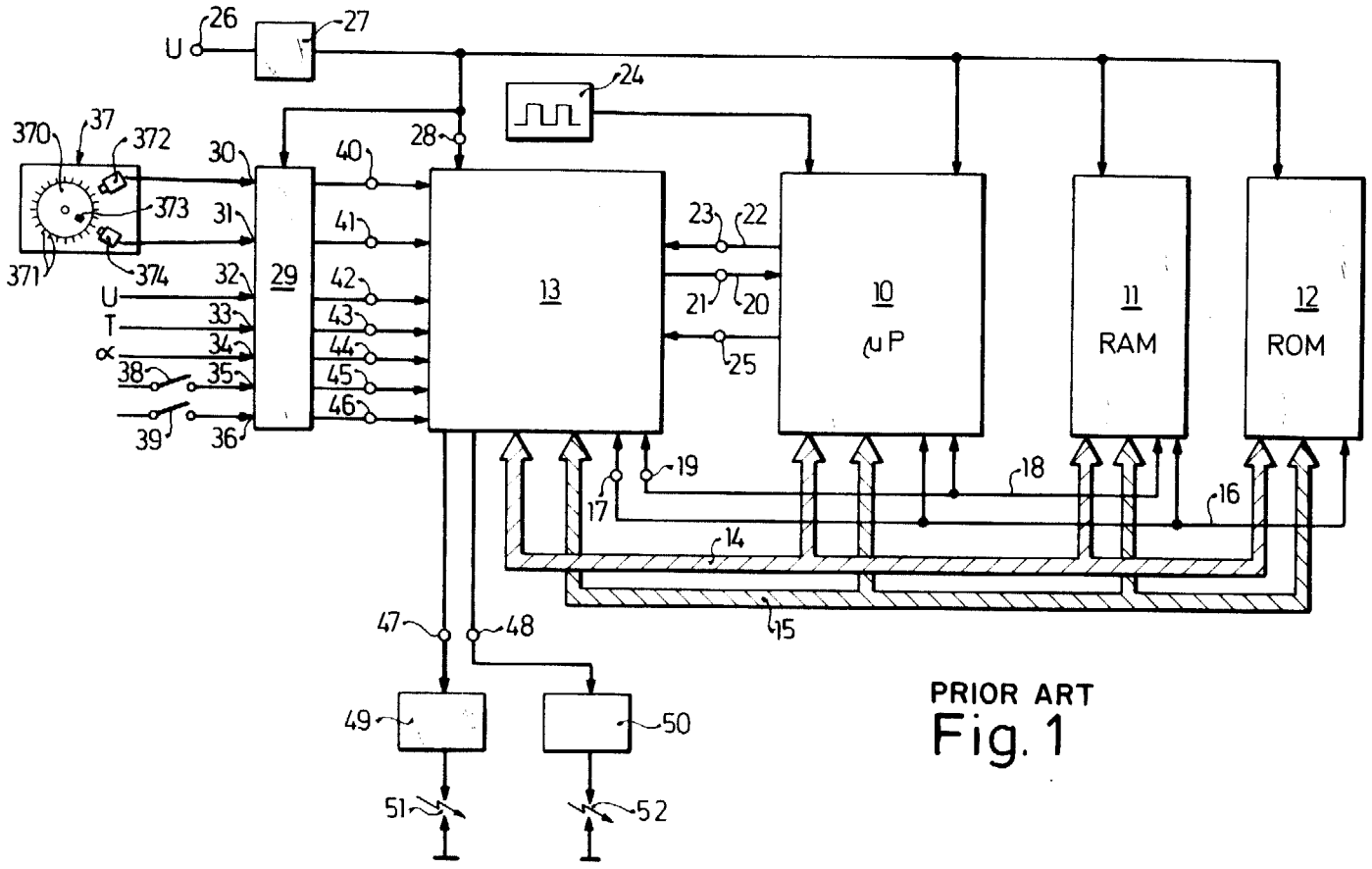
PRIOR ART Fig. 1
FIG. 1 is a block diagram of a known microcomputer system for an internal combustion engine.

The presently known microcomputer system illustrated in FIG. 1 contains a microprocessor 10 with a random access memory 11, that may be regarded as a kind of operating memory, a read-only memory 12 for storing fixed values and instructions, such a memory being known by the acronyms ROM, PROM or EPROM, and an input-output unit 13, all connected over a data bus 14 and an address bus 15. As required by the information content to be transferred, for example, from the number of selectable addresses, such a data bus 14 can, for example, consist of eight separate conductors and the address bus 15, for example, of three individual conductors. In other words, an eight bit data bus and a three bit address bus are typical, but the data bus may need more lines if longer "words" are to be stored and the address bus likewise if there are to be more selectable addresses.

A read-enable conductor 16 connects the components 10, 11 and 12, and is connected to a terminal 17 of the input-output unit 13, serving to call out the applied or stored information. A write-enable conductor 18 connects the components 10 and 11 and is connected to the terminal 19 of the input-output unit 13 for putting information in temporary or buffer stores.

An interrupt lead 20 extends from the input-output unit 13 over its terminal 21 to the microprocessor 10. This connection serves to interrupt a program currently running in the microprocessor when certain information is present. A "clear" lead extends from the microprocessor 10 to a terminal 22 and thence into the input-output output unit 13. It serves to set certain initial conditions, for example, when a program begins.

A clock pulse generator 24 serves to provide a basic clocking frequency to the microprocessor 10. Preferably a frequency obtained from the clock pulse frequency by frequency division is supplied over the terminal 25 to the input-output unit 13.

A voltage regulator circuit 27 is provided which is fed by a supply voltage at its terminal 26 to provide a stablized ouput voltage to a terminal 28 and thereby to the various components in which electronic apparatus is located.

An input circuit 29 is also provided that has seven inputs 30–36 connected with external signal generators. The condition of a machine such as the internal combustion engine of a vehicle, at any time, can thereby be made available to the computer. The signal generator 37 connected with the inputs 30 and 31 consist preferably of a gear wheel 370 connected with the crank shaft of an internal combustion engine on which there are provided a multiplicity of teeth 371. The passage of these teeth is sensed by a first sensor 372, each ferromagnetic tooth producing a flux change in the inductive sensor 372 to produce a voltage signal impulse. The speed dependent signal sequence thus produced is supplied to the input 30. Instead of ferromagnetic teeth, other marks could also be provided, the passage of which could be detected by other kinds of sensors. Thus a disk can be magnetized stripwise in the circumferential direction or a pattern of holes can be provided which can be detected by optical devices.

A reference mark 373 is also provided on the disk 370. This reference mark 373 can, of course, be provided on another disk or on another rotating part of the machine. The reference mark 373 is detected by a second signal generator 374 and the reference mark signal is supplied to the input 31. Further information from the internal combustion engine or from the vehicle are supplied, for example, supply voltage U, temperature T, throttle position $\alpha$, position of the throttle switch 38 and position of the starting switch 39, at the respective inputs 32 to 36. The number of these additional information sources can be extended still further and is not limited to the particular kinds of information here illustrated. The illustrated seven sources of information at the inputs 32 to 36 are prepared, freed of disturbances and digitalized so far as necessary in the input circuit unit 29. On the output side of the assembly 29, the same information is provided over the terminals 40–46 in more usuable form to the input-output unit 13. To the extent the information supplied to the input circuits 29 is present in analog form, they are converted into digital form by analog-digital converters provided in the input circuits 29. For example, signal preparation can be produced with the use of Schmitt trigger circuits. The freeing of signals from disturbances can be done by well known circuits for elimination of transients and circuits for protection against over-voltage.

Two final stage outputs of the input-output unit are shown connected over the terminals 47 and 48 with switching final states 49 and 50 respectively. In the illustrated case, these are ignition final stages. Such ignition final stages contain, as is well known, a semiconductor switch in the primary current cicuit of an ignition coil, in the secondary current circuit which at least one spark gap 51, 52 or sparkplug is connected. Such final stages 49, 50 and any more that may be provided, could just as well be stages for controlling fuel injection in an internal combustion engine.

The manner of operation of the microprocessor system of the kind shown in FIG. 1 which is itself known, is widely described in the literature. In addition to the references named in the introduction, the operation of such system is described principally in the user's handboooks of the various microprocessor manufacturers, in which there is described in detail both the constitution and the manner of connection of the individual components, as well as their mode of operation and their programming. Assembly variations and circuit possibilities and recommendations are given in a great amount of detail. An example of such explanations and instructions are the handbooks of RCA entitled "User Manual for the CDP-1802 Cosmac Microprocessor MPM-201A" and "RCA, Integrated Circuits, SSD-210, 4-76". Within the framework of a program stored in the read-only memory 12, data applied externally to the input-output unit 13 is processed by the microprocessor 10 in comparison or correlation with data permanently stored in the read-only memory. The computed results, in the present case the ignition timing moments and the circuit closing moments, are supplied to the final stages 49 and 50 for carrying out the desired switching commands. Final results and intermediate results are partly stored intermediately in the random access memory 11 in order to be called up as needed by the microprocessor.

The number and variety of microprocessors, read-only memories and random access memories is not limited by the representation given in FIG. 1, but can be extended to any extent necessary in accordance with the data to be processed, the scope of the program and the scope of the stored data. This range of choice of course depends upon the component type used in the particular case and from its operating and storage capacities, that is, for example, from the number of bits to be operated upon at one time or to be stored.

THE INPUT-OUTPUT UNIT OF THE PRESENT INVENTION

Figure 2:
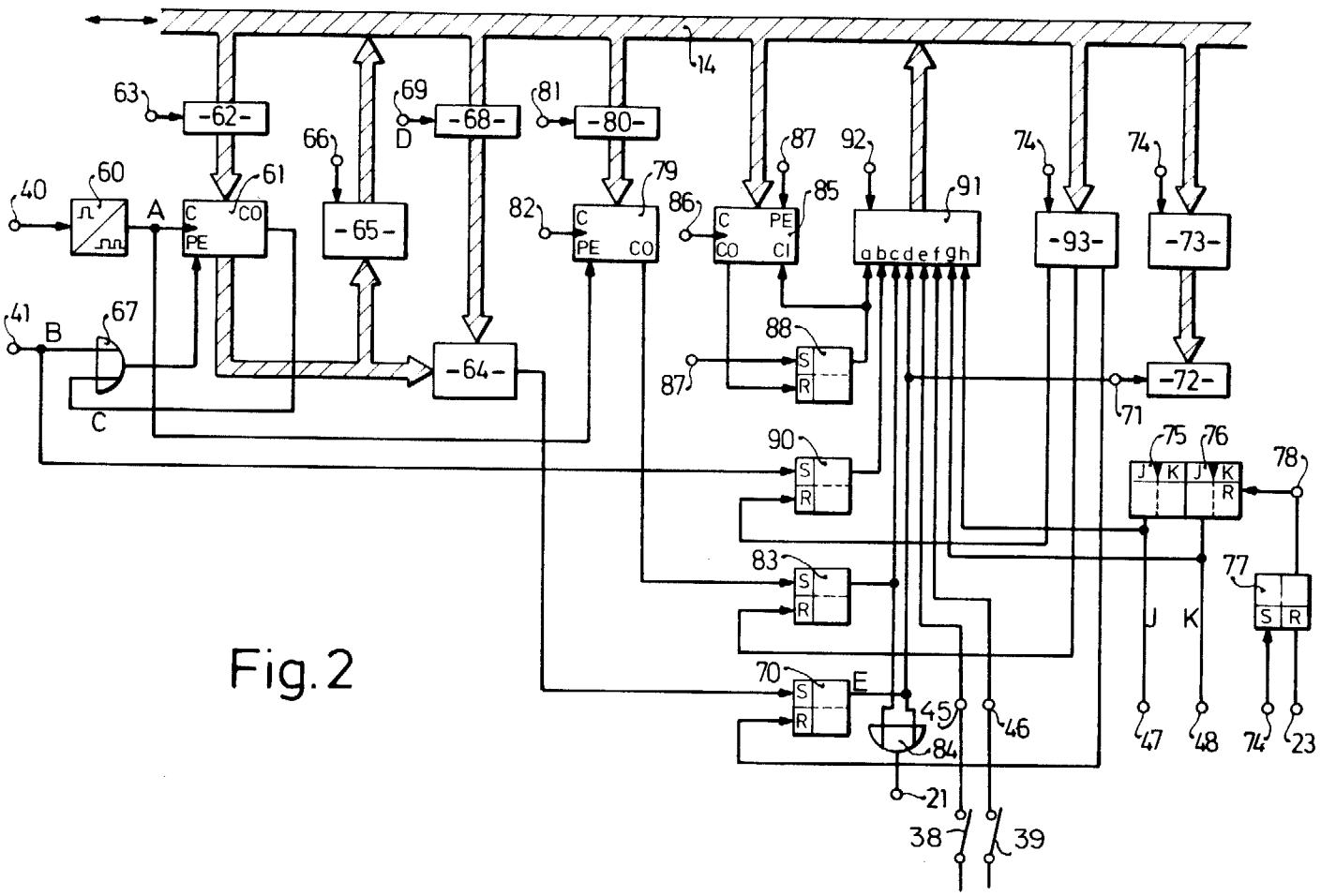
FIG. 2 is a block diagram of an input-output unit embodying the present invention for use in a system organized in the manner of FIG. 1.

The illustrative embodiment of the invention shown in FIG. 2 has a terminal 40 to which a speed signal is applied connected over a frequency multiplier stage 68 to the counting input C of a first counter 61. The data bus 14 is connected through a first buffer store 62 with the set inputs of the first counter 61. The transfer input of the buffer store 62 is controlled over a terminal 63. The count output of the first counter 61 is connected both to a first comparison input of a comparator 64 and also through a first gate circuit 65 with the data bus 14. The first gate stage 65 is preferably constituted as a parallel circuit of various transmission gates and is controlled over a terminal 66. The terminal 41 over which the reference mark signal is supplied is connected through an OR-gate 67 with the "preset enable" (loading) input PE of the first counter 61. The CARRY OUT (overflow) output CO of the first counter 61 is connected with the other input of the OR-gate 67. The second comparison inputs of the comparator 64 are connected to the data bus 14 through a second buffer store 68. The second buffer store 68 is controlled over a terminal 69. The output of the comparator 64 is connected to the set input S of a bistable circuit (flip-flop) 70, the output of which is supplied over a terminal 71 to the control input of a select logic circuit 72. The selection of the individual final stage channels is performed in response to the data bus 14 through a first decoding stage 73, the outputs of which are also connected to the select logic circuit 72 and are controlled over a terminal 74. A detailed representation of the circuit connections of the components 72 and 73 is given in FIG. 6. The J and K inputs of JK flip-flops 75 and 76 are connected to the outputs of the select logic circuit 72. One output of each of the two flip-flops 75 and 76 is connected with one of the two terminals 47 and 48 for control of the final stages 49 and 50 respectively. The terminal 23 is connected to the reset input R of a flip-flop 77, from which an output is connected through a terminal 78 to the reset input R of the flip-flop array 75, 76. The set input S of the flip-flop 77 is connected to the terminal 74.

For shutting off the quiescent current in the final stages 49 and 50, a second counter 79 is provided having set inputs connected to the data bus 14 through a third buffer store 80. The third buffer store 80 is controlled over a terminal 81. The counting input C of the second counter 79 is connected to a terminal 82 that supplies a counting frequency. The preset enable input PE of the second counter 79 is connected to the output of the frequency multiplier stage 60. The carry out output CO of the counter is connected with the set input S of a flip-flop 83, the output of which, as well as the output of the flip-flop 70, is connected in a OR-gate 84 with the terminal 21.

For the determination of different required time intervals, a timing circuit constituted as a third counter 85 is provided, of which the set inputs are connected to the data bus 14. The counting input C is connected through a terminal 86 over which a counting frequency is provided. The preset enable input PE is connected to a terminal 87. The carry out ouput CO is connected with the reset input R of a flip-flop 88, the output of which is connected to a carryin gate input CI of the third counter 85. The said input of the flip-flop 88 is controlled over the terminal 87.

The terminal 41 is the terminal over which a reference mark signal for the microprocessor comes in. This terminal is connected with the set input S of a flip-flop 90 of which the output is connected to the input terminal b of a report-back gate 91. The outputs of this report-back gate 91 are controlled over a terminal 92, subject to which control they are connected to the data bus 14. Other inputs a and c to h are connected with the output of the flip-flops 88, 83 and 70, with the two terminals 45 and 46 and with the outputs of the flip-flops 75 and 76. The terminals 45 and 46 of FIG. 2 are connected to show the position of the throttle and starting switches, respectively, by means of switch arms 38 and 39.

The control of the respective reset inputs R of the flip-flops 70, 83 and 90 is provided by a second or "report-reset" decoding stage 93 connected with the data bus 14 and having a control input connected to the terminal 74.

The input signals for the circuit of FIG. 2, as well as for the circuits illustrated in Figures yet to be described are preferably synchronized or regularly scanned (rastered). The synchronizing stages necessary for this purpose have been omitted from the drawings to simplify the illustration. Such circuits are well known, so that it is not necessary to illustrate them, being disclosed, for example, in the above-described German published patent application 2,504,843 and U.S. Pat. No. 4,063,539. The circuit shown in that reference also serves to illustrate the frequency doubling that is useful in a similar way in the present case. Finally, the claims in the present case do not show the amplifier stages that in practice are needed at some, if not all, of the outputs. These can be provided according to the signal levels available and the requirements of the particular output.

Figure 3:
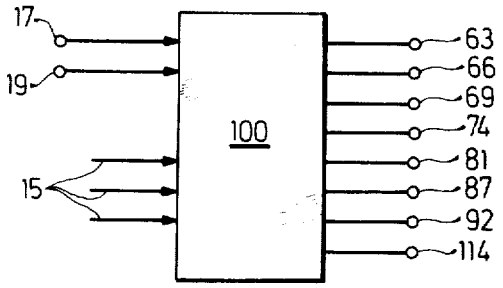
FIG. 3 illustrates in block form a decoder device for control of the components of FIG. 2 that are connected to the data bus.

Decoder 100 illustrated in FIG. 3 serves to control the gating stages, buffer stores, decoder stages and counters shown in FIG. 2 over their respective control terminals 63, 66, 69, 74, 81, 87, 92 and 114. For this purpose it is connected on its input side with an address bus 15 corresponding to the one shown in FIG. 1 and with the read enable connection 16 and write enable connection 18, these latter two connections being made over the terminals 17 and 19 illustrated in FIG. 3 which correspond to those similarly designated in FIG. 1. As mentioned before, the outputs of the decoder 100 are respectively connected to the terminals 63, 66, 69, 74, 81, 87, 92 and 114 of FIG. 2. Depending upon the input signals applied, a signal appears at one or more output terminals of the decoder 100 by which the stage connected to each activated terminal is thereby actuated. Thus, for example, a signal can be caused to pass through a gate stage or a counter and be caused to be set at an applied count value. The sequence of these commands is determined by the microprocessor in accordance with its program and is communicated as a sequence of commands over the connections 15, 16 and 18.

MODE OF OPERATION

The basic mode of operation of the input-output unit constituted by FIGS. 2 and 3 together with other conventional components corresponding to those in FIG. 1 in FIG. 1 is best explained with reference to the diagram of FIG. 4 which shows the relation of a signal to a counter content.

The signal sequence indicating speed (rotation rate) applied to the terminal 40 is multiplied in frequency in the frequency multiplier stage 60, preferably simply doubled, and appears as the signal sequence A at the counting input the first counter 61 that is constituted as a down-counter. The signal sequences represented in FIG. 4 illustrate the case of a speed parameter that remains constant. The reference mark signal B applied to the preset enable input of the counter 61 causes the state of the counter 61 to be set at the count value stored in the first buffer store 62. This buffer-stored count value was previously transferred into the buffer store 62 from the data bus upon the provision of a control signal at the terminal 63. The count value thus provided is then counted down at the rate of the signal pulse sequence A until a carry out (overflow) signal C appears at the carry out output of the counter when the count condition is zero. This overflow signal C produces a new setting of the counter 61, passing through the OR-gate 67. The signal C thus operates as a supplementary internal reference mark signal. The number of successive counter intervals until the renewed appearance of an external reference mark signal B is related in the illustrated case to the number of cylinders of the vehicle engine that is served by the system. In the case of an 8-cylinder gasoline engine, four reference marks per revolution are necessary. With a single external reference mark signal B, that means that three internal reference mark signals C per revolution must be provided and this is what is shown in FIG. 4. At the beginning of the fifth cycle, not shown in the drawing, the external and internal reference marks come together. Of course, the system would work equally well with two external and two internal reference mark signals.

The count value obtained from the buffer store 62 is variable and is determined by the microprocessor program according to the current parameter value. The counter content present at the output of the counter 61 can be read at any time by the microprocessor by interrogation produced by applying a signal to the terminal 66 through the data bus 14 at the first gate stage 65.

In the second buffer store 68, the count values provided over the data bus in synchronism with signal sequence D applied to its control input are temporarily stored. These count values change in the illustrated example between Z1 and Z2. These temporarily stored count values are supplied to the second comparison inputs of the comparator 64. As soon as the content of the counter 61 reaches the count value Z2, the comparator 64 produces a first output signal and when it reaches the count condition Z1, a second output signal. These output signals are represented as the signal sequence E in FIG. 4. By these signals of the signal sequence E, the flip-flop 70 is set each time, this flip-flop being reset in each case by signals of the second decoder stage 93. By means of the output signals of the flip-flop 70 and thus indirectly by the signals E, the flip-flop array 75, 76 is alternately set and reset through the select logic 72 that in turn is controlled by the first decoder stage 73, so that the signal sequences J and K appear at the outputs of the flip-flop array 75, 76. This will be further explained in connection with FIG. 6.

The signal sequences J and K alternately control the final switching stages 49 and 50 and produce, in the case of an ignition system, the closing times of the electrical switch in the primary current circuit of an ignition transformer at the beginnings of signals and, at the end of the signal, the moment at which ignition is produced. In the case of fuel injection systems, these signals correspond to to the fuel injection duration and the fuel injection timing.

At the beginning of the program, a reset signal is provided over the terminal 23 by which the flip-flop 77 is reset, which has the consequence of resetting the flip-flop array 75, 76. By this arrangement defined initial conditions are produced. The setting of the flip-flop 77 takes place thereafter through the decoder 100 and the terminal 74.

In order to produce a switching off of the quiescent current in the switching terminal stages 49 and 50, it is desirable that below a certain speed the current should be turned off, which is to say that the electrical switches contained in the final stages 49 and 50 should be open. In order to recognize this lower speed limit, the counter 79 loaded at every signal A with the stored count value in the buffer store 80 and is counted down at the frequency of the counting frequency applied to the terminal 82. Above this limiting speed, the time between two signals A is not sufficient to allow the counter to reach 0, i.e. no overflow signal is produced at the carry out output CO. Below the predetermined limiting speed, such as overflow signal is produced and sets the flip-flop 83. This is, on the one hand, communicated to the microprocessor through the input c of the check-back gate stage 91 and, on the other hand, produces a so-called interrupt signal at the terminal 21, by which the currently running program can be interrupted. This interruption of a running program by an interrupt signal is a conventional provision in processors, as has already been mentioned in the introductory statements above. The limit speed can be varied over the data bus 14 by loading variable count values into the buffer store 80.

The third counter 85, together with the flip-flop 88, constitute a timing circuit by which the different control periods required for the system can be provided. By means of a control signal from the decoder 100 at the terminal 87, the flip-flop 88 is set and at the same time the counter 85 is loaded with the count value present on the data bus 14. This count value is then counted down at the count frequency supplied at the terminal 86 until the count content 0 is reached and in the carry out output CO a reset signal for the flip-flop 88 is produced. This reset signal, in addition to resetting the flip-flop 88, simultaneously blocks the counter 85 by means of the gate input CI (carry in) with respect to further counting cycles. The duration of the output signal at the flip-flop 88 provides the ON time of the timing circuit. Interrogation by the microprocessor can take place over the check-back gate stage 91. Other conditions can also be interrogated, such as the switching condition of the throttle control switch 38 and of the start switch 39, over the terminals 45 and 46. The same applies to the output control signals at the terminals 47 and 48. The entirety of this information is gathered in the check-back stage 91 and is in part stored in the flip-flops 88, 90, 83 and 70. Interrogation is produced by a control signal at the terminal 92.

By means of the decoder 100 it is possible from address, write and read signals not only to produce control signals for program-controlled loading of buffer stores and counters and reading registers and counters, but it is also possible, according to the program, to select among two or more input-output units that, for example, can be simultaneously connected with a microprocessor. Thus it is possible, with two input-output units, to operate a combined ignition and fuel injection system with a single microprocessor.

Figure 5:
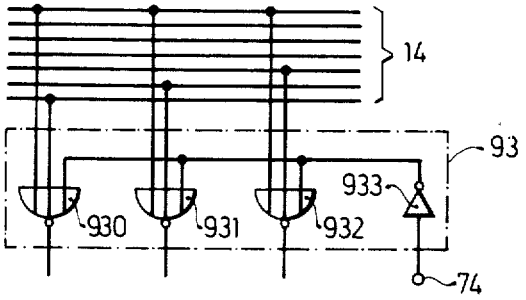
FIG. 5 is a diagram of an illustrative form of a report-reset decoding stage for the circuit of FIG. 2.

FIG. 5 illustrates in circuit diagram of one form of report-reset decoder stage constituted by a second decoder stage 93 that is provided with three NOR-gates 930, 931 and 932. One input of each of these NOR-gates 930 to 932 is connected with a conductor of the data bus 14 while another input of each of them is connected through an inverter 933 with the terminal 74. Still another input of each of the three NOR-gates 930 to 932 is connected to one of the three further conductors of the data bus 14. An output signal is produced by one of the NOR-gate outputs only if 0-signals are present at all three of its inputs. This is the case, if on the one hand, the 0-signal is present at the common data conductor of the data bus 14, also a control signal at the terminal 74 that is converted into a 0-signal by the inverter 933 and, in addition, still another 0-signal is provided at the particular data conductor of the data bus 14 to which the particular NOR-gate is connected.

Figure 6:
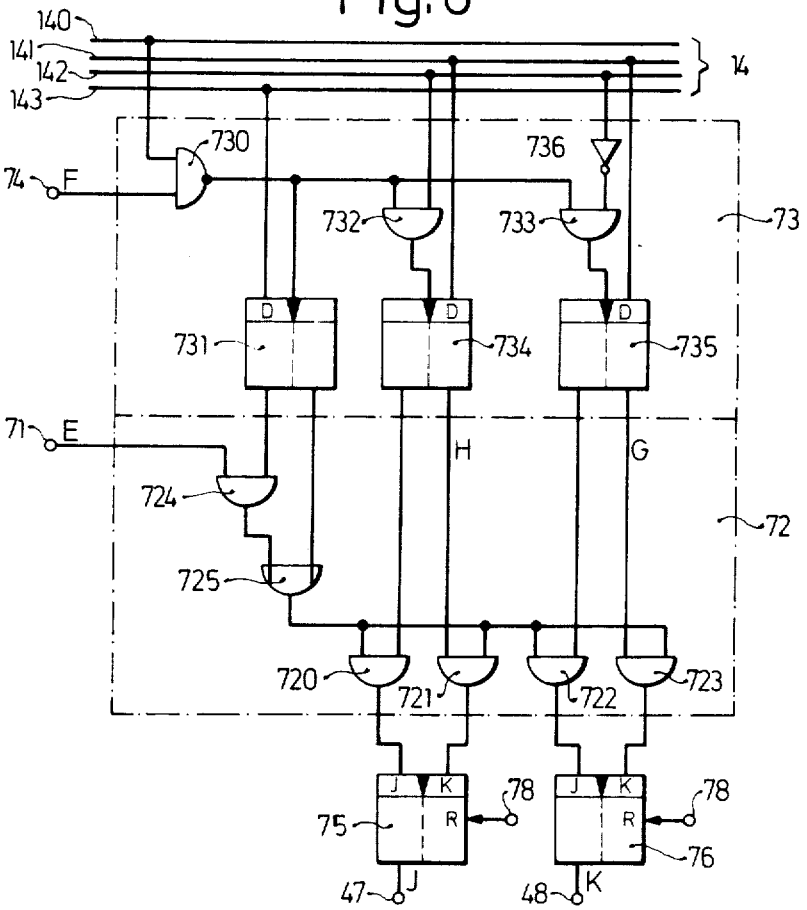
FIG. 6 is an illustrative form of a control decoder stage and a select logic circuit for the circuit of FIG. 2, and, FIG. 7 is a block diagram of a further elaboration of the illustrative embodiment of the invention of FIGS. 2,3, 5 and 6.

FIG. 6 illustrates one circuit form in which the control decoder stage 73 and the select logic 72 can be constituted for the input-output unit of FIG. 2.

A first data conductor 140 of the data bus 14 is connected through an AND-gate 730 the synchronizing input of a first D flip-flop 731. The terminal 74 is connected to another input of the AND-gate 730. The output of the AND-gate 730 is connected to an input of each of two AND-gates 732 and 733, the respective outputs of which are provided to the synchronizing inputs of two additional D flip-flops 734 and 735. The D inputs of these flip-flops 734 and 735 are connected to a second data conductor 141 of the data bus 14. A third data conductor 142 is connected with the second input of the AND-gate 732 and also through an inverter 736 with the second input of the AND-gate 733. The two complementary outputs of the flip-flop 734 are connected over respective AND-gates 720 and 721 with the two inputs of the JK flip-flop 75, while the two complementary outputs of the D flip-flop 735 are connected through respective AND-gates 722 and 723 to the two inputs of the JK flip-flop 76. An output of the D flip-flop 731 is connected through an AND-gate 724 to one input of an OR-gate 725, the output of which is connected to the second input of each of the AND-gates 720 to 723. The inverting input of the D flip-flop 731 is connected with the second input of the OR-gate 725. The terminal 71 is connected to another input of the AND-gate 724.

Figure 4:
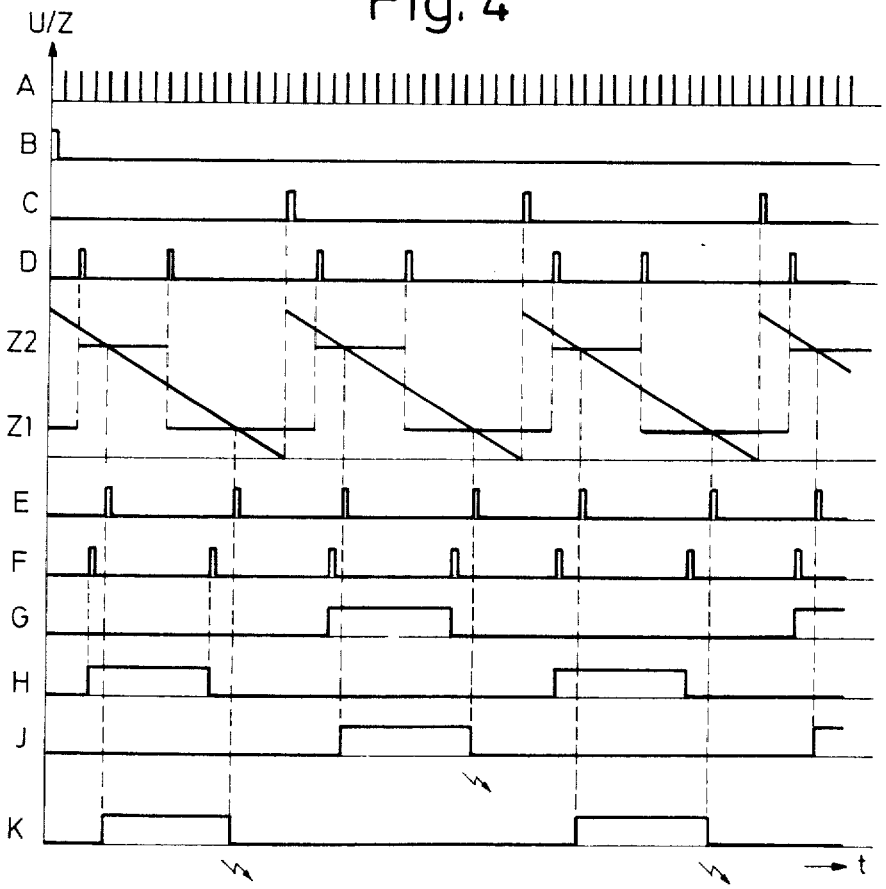
FIG. 4 is a diagram illustrating the relation of a signal wave to a counter content for explanation of the manner of operation of the embodiment of the invention illustrated in FIGS. 2 and 3.

FIG. 4 should be considered again for understanding the mode of operation of the arrangement of FIG. 6. The signals E from the terminal 71 can be blocked by the flip-flop 731 if the inverting input provides a 1-signal. In this case the control of the two JK flip-flops 75 and 76 is provided exclusively over the data bus 14, as is necessary, for example, with switching off of the final stages below a limiting speed. If a 0-signal is present at the output of the flip-flop 731, the AND-gates 720 to 723 are operated by the signals E. Whether the flip-flop 75 or the flip-flop 76 is actuated by a signal E or by an inverted output signal of the flip-flop 731 is decided in the first decoder stage 73.

A control signal sequence F appears at the terminal 74 at the output of the AND-gates 730 when a 1-signal is present on the data conductor 140. This signal sequence operates as a synchronizing signal either for the flip-flop 734 or for the flip-flop 735 according to whether the data conductor 142 provides a 1-signal or a 0-signal. The first signal F shown, because of the presence of a 1-signal on the data conductor 142, operates on the flip-flop 734. When this signal F occurs there is 0-signal present on the data conductor 141, the output of the flip-flop 734 connected to the AND-gate 721 changes from a 1-signal to a 0-signal. The second signal F is shown as acting as the synchronizing signal of the flip-flop 735 on account of the presence of a 0-signal on the data conductor 142. It is assumed for the purpose of illustration that at the same time a 1-signal is present on the data conductor 140, the output of the flip-flop 735 connected to the AND-gate 723 changes from a 0-signal to a 1-signal. The third signal F is shown as operating again on the D flip-flop 735, the output of which now changes to a 0-signal because of the presence of a 0-signal on the data conductor 141. These events repeat themselves in the illustrated sequence. A correlation of the signal sequences H and G or their inverter signal sequences, with the signal sequence E through the AND-gates 720 to 723 leads to the signal sequences J and K by which, as already explained above, the closing time for an ignition final stage can be determined. For a case in which a 1-signal is present at the inverting output of the D flip-flop 731, hence for the case of direct control of the final stage array through the microprocessor, the signal sequences G and H are directly transferred as signal sequences J and K at the outputs 47 and 48. This transfer takes place in step with a synchronizing or "clock" frequency applied, in a manner not shown in the drawings, to the JK flip-flops 75, 76, which frequency is very high in comparison to the frequency of the signal sequences G and H.

Figure 7:
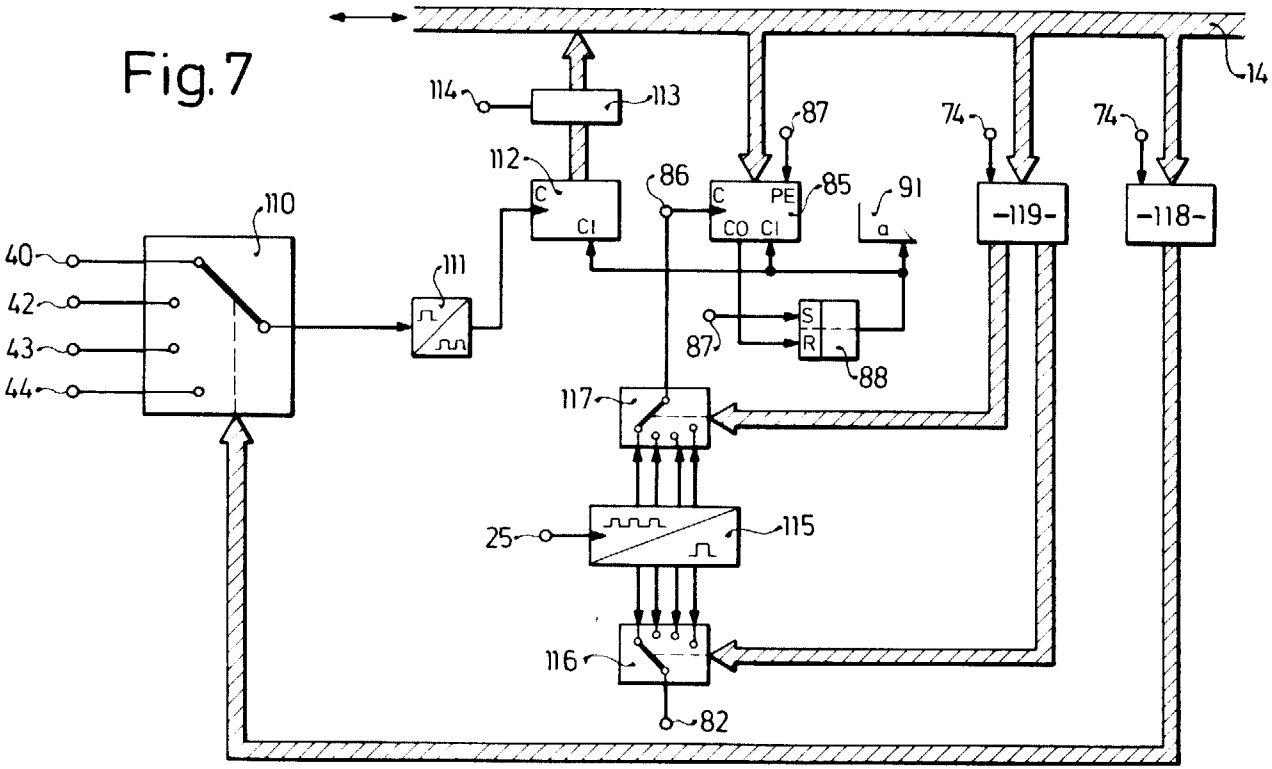

FIG. 7 shows further elaboration and extension of the input-output unit 13 in part connected with components already illustrated and described. The latter components are designated by the same reference numerals and are not further described in connection with FIG. 7. The terminals 40 and 42 to 44, to which are applied signals from external signal generators, are connected through a selection switching arrangement 110 preferably consisting of the parallel combination of a plurality of transmission gates, with a frequency multiplying stage 111, the output of which is connected to the counting input C of a fourth counter 112. The count content outputs of the fourth counter 112 are connected to the data bus through a third gate stage 113 preferably consisting of a multiplicity of transmission gates. The control of the third gate stage 113 is performed over the terminal 114, which represents an additional output terminal of the decoder 100. The carry in gate input CI of the fourth counter 112 is connected with the output of the flip-flop 88.

The terminal 25 that provides the basic clock frequency of the input-output unit is connected with the input of a frequency divider stage 115 at the eight outputs of which preferably eight different output frequencies are made available. The first four output frequencies are supplied through a selection switching arrangement 116 and over the terminal 82 to the counting input C of the second counter 79. The remaining four output frequencies are provided through another selection switching arrangement 117 and over the terminal 86 to the counting input of the third counter 85. For control of the three selection switching arrangements 110, 116 and 117, two switchover decoder stages 118 and 119 are connected on the one hand to the data bus 14 and on the other to the switchover inputs of the above-identified selection switching arrangement. The dispatching of the switching commands takes place over the terminal 74 that is connected to the switchover decoder stages 118 and 119.

The mode of operation of the supplementary switching arrangement illustrated in FIG. 7 for the input-output unit 13 consists in that the signal generator frequency doubled in the frequency multiplier stage selected through the selection switching arrangement at the particular time is converted in the counter 112, for example, into an eight bit data word, which under control through the terminal 114 is read into the data bus 14. For this purpose the counting frequency pulses during a gate time prescribed by the timing circuit 85, 88 are counted in the counter 112. The final count condition is thereby a measure for the signal applied by the particular signal generator and it can be picked up as a data word by the microprocessor over the data bus 14.

In order to increase the variability and flexibility of the input-output unit 13, it is desirable for the counting frequency of the counters 85 and 79 to be varied. This is provided by supplying differently subdivided basic count frequencies through the selection switching arrangements 116, 117 to the respective counters 79 and 85. The selection of the subdivided frequencies takes place over the data bus and through the switchover decoding stages 118 and 119 by which the selection switching arrangements 116 and 117 are operable. By the duplicated variation capability, on the one hand through the counting frequency and on the other by the count value settings, very broad range of applicability and of fields of utilization of these counters is made possible. When there is a signal at the terminal 74, an output signal appears at one of the outputs of the decoder stages 118 and 119 as the result of which one of the transmission gates contained in the selection switching arrangements 110, 116, 117 passes the applied frequency.

In the table given below, listed for purposes of example and illustration, are some commercially available components usable in the above-described circuits. The listed components in this case are components made available under the trademark RCA, with one exception in which the source is identified parenthetically, and these components are designated by type numbers by which they are normally identified.

| Component | Type designation(s) |
|---|---|
| Microprocessor 10 | CDP 1802 D or CDP 1802 CD |
| Random access memory 11 | CDP 1824 |
| Read only memory 12 | CDP 1833 CD |
| Counters 61, 79, 85, 112 | 4029 |
| Buffer stores 62, 68, 80 | 4042 |
| Comparator 64 | MC 14 585 (Motorola) |
| Gate stages 65, 91, 113 | 4016 |
| Decoder stages 73, 93, 100, 118, 119 | CD 4556 |
| Selection switching arrays 110, 116, 117 | 4016 or 4052 |
| Frequency divider stage 115 | 4040 |

Although the invention has been described with reference to a particular illustrative embodiment, it is evident that variations and modifications are possible within the inventive concept. Thus, it has already been mentioned that more than one input-output unit can be used by the same microprocessor for controlling different operations of the same machine, for example, fuel injection and ignition timing of an internal combustion engine, and, of course, other kinds of combined operations can be provided either by extending the scope of operation of an input-output unit, or by utilizing two or more input-output units, or both.

I clain:

1. In a system for controlling repetitive operations of a machine dependent on operating parameters such as the operation of electrical ignition in an internal combustion engine, which system comprises a microprocessor, a clock pulse generator, a read-only memory (ROM, PROM), a random access memory (RAM), a data bus and an address bus, both interconnecting said microprocessor with said read-only memory and said random access memory, and read and write enable connections for enabling the reading of said memories and writing into said random access memory the data on said data bus at the memory address specified on the said address bus, an input-output unit for said system connected to said address bus and read and write connections including a decoding circuit, connected to said data bus, and connected to said microprocessor also through "clear" and "interrupt" connections for receiving a clearing command from said microprocessor and for providing an interrupt to said microprocessor, said input-output unit comprising:

a counter (61) for counting shaft rotation rate dependent signals arranged for operation in successive counting invervals, the length of which intervals are determined by setting of said counter through said data bus (14), and the position in time of which intervals is controlled by at least one timing reference mark of said machine, said counter having a multibit count state output and having input connections for having a count value set therein for initiation of counting and termination of and for counting said signals;

a comparator (64) and a buffer store (68) therefor, said comparator having one multibit comparison input connected to the count-state output of said counter (61) and its other multibit comparison input connected to said buffer store (68), and having an output for indicating at least one comparison condition of signals at said inputs thereof, said buffer being arranged to have its content written through said data bus;

a selectable multi-channel final stage array (75, 76, 49, 50) and providing a plurality of output command channels, and select logic circuits (72, 73) for sequential preselection of said channels of said final stage array, said select logic circuits being connected to said data bus for their control and to said final stage array for channel preselection in response to a signal of a control signal sequence (F) and including circuits for transferring timed signals (E) obtained in response to the output of said comparator to the channels preselected in sequence, said decoding circuit (100) being constituted so as to provide stepwise control of the various circuit components connected with said data bus (14) as selected over said address bus (15).

2. An input-output unit for an operation control system containing a microprocessor, as defined in claim 1, wherein an OR-gate (67) is provided having one input responsive to a signal resulting from said timing reference mark, and another input responsive to the overflow output of said counter (61) for generation of additional timing reference signals for controlling the position in time of said intervals.

3. An input-output unit for an operation control system containing a microprocessor, as defined in claim 1, wherein a frequency multiplying stage (60) is interposed in the input connection of said counter (61) for counting said signals.

4. An input-output unit for an operation control system containing a microprocessor, as defined in claim 1, wherein a second counter (112) is provided which is arranged for being supplied with at least one magnitude value of an operating parameter of said machine in the form of a frequency and which is arranged to have its counting time prescribed by a timing circuit (85, 88), and furthermore, is arranged so that its count result is transferable through a gate stage (113) to said data bus (14).

5. An input-output unit for an operation control system containing a microprocessor, as defined in claim 4, wherein means are provided for supplying a plurality of magnitude values dependent upon operating parameter values of said machine through a transfer switching device (110) to said second counter (112) and means are also provided for control of said transfer switching device (110) through a parameter selection decoder stage (118) controlled by said data bus (14), said decoder stage having an enabling input controlled by an output (74) of said decoding circuit (100).

6. An input-output unit for an operation control system containing a microprocessor, as defined in claim 4, wherein said timing circuit (85,88) comprises a third counter for counting at a predetermined counting frequency and arranged for being supplied a count content from said data bus (14) in response to an enabling signal from an output (87) of said decoding circuit (100) for use of said count content as a number from which down counting is performed by said counter.

7. An input-output unit for an operation control system containing a microprocessor, as defined in claim 6, wherein a frequency selection decoder stage (119) and a frequency selecting circuit (117) controlled through said frequency selection decoder stage in response to an output (74) of said decoding circuit (100), whereby said predetermined counting frequency is subject to being varied over said data bus.

8. An input-output unit for an operation control system containing a microprocessor, as defined in claim 6, wherein a stage (79) for evaluation of shaft speed with respect to a speed threshold value is provided for cutting off the quiescent current of said final stage array (49, 50) by providing a signal for transfer into said data bus (14) in response to recognition that said shaft rotation speed is less than said speed threshold value.

9. An input-output unit for an operation control system containing a microprocessor, as defined in claim 8, wherein said shaft speed evaluation stage (79) is constituted in the form of a counting frequency counter that operates in successive counting intervals, the beginning of each of which intervals is determined by shaft rotation speed signals and that are arranged to provide a signal representative of the reaching of a shaft rotation speed lower threshold when the count content reaches a predetermined value.

10. An input-output unit for an operation control system containing a microprocessor, as defined in claim 9, wherein means are provided for varying said shaft rotation speed lower threshold by variably setting the counter of said shaft rotation speed evaluation stage (79) over said data bus (14).

11. An input-output unit for an operation control system containing a microprocessor, as defined in claim 8, wherein said shaft speed evaluation stage (79) is constituted in the form of a counter and in which a second frequency selecting circuit (116) is provided whereby the counting frequency of said last-mentioned counter is subject to being varied in response to commands received over said data bus (14), by said frequency selection decoder stage (119) when enabled by an output (74) of said decoding circuit (100).

12. An input-output unit for an operation control system containing a microprocessor, as defined in claim 7 or claim 11, wherein in which the respective frequency selection circuit (117, 116) is constituted by a frequency divider stage (115) provided for operation at a base counting frequency and producing therefrom a plurality of output frequencies, and a transfer switching device (116,117) provided for selection among siad putput frequencies of said frequency divider stage (115).

13. A input-output unit for an operation control system containing a microprocessor, as defined in claim 1, wherein at least one report-back gate (91) is provided that is connected with said data bus for transferring to said data bus data produced either internally or externally of said input-output unit or partly internally thereof and partly externally thereof.

14. An input-output unit for an operation control system containing a microprocessor, as defined in claim 13, wherein a buffer store (88,90,83,70) is interposed in the input lead of at least one input of said report-back gate (91).

15. An input-output unit for an operation control system containing a microprocessor, as defined in claim 13, wherein at least one input of said report-back gate (91) is connected with a signal provided by a switch (38,39).

*16. In a system for controlling repetitive operations of a machine dependent on operating parameters, such as the operation of electrical ignition in an internal combustion engine, which system comprises a microprocessor, a clock pulse generator, a read-only memory (ROM, PROM), a random access memory (RAM), a data bus and an address bus, both interconnecting said microprocessor with said read-only memory and said random access memory, and read and write enable connections for enabling the reading of said memories and writing into said random access memory the data on said data bus at the memory address specified on the said address bus,*

*an input-output unit for said system connected to said address bus and read and write connections including a decoding circuit (100), connected to said data bus, and connected to said microprocessor also through "clear" and "interrupt" connections for receiving a clearing command from said microprocessor and for providing an interrupt to said microprocessor, said input-output unit comprising:*

*means for communicating reference mark signals (B) derived from operation of said machine to said microprocessor through said data bus (14) for synchronizing signals of a control signal sequence (F) determined by said microprocessor and furnished to said decoding circuit (100) of said input-output unit through said data bus (14),*

*said decoding circuit (100) being constituted so as to provide stepwise control of the various circuit components connected with said data bus (14) as selected over said address bus (15);*

*a timing circuit (85,88) comprising a first counter for counting at a predetermined counting frequency and arranged for being supplied a count content from said data bus (14) in response to an enabling signal from an output (87) of said decoding circuit (100) for use of said count content as a number from which down counting is performed by said counter;*

*a second counter (112) which is arranged for being supplied with at least one magnitude value of an operating parameter of said machine in the form of a frequency supplied as a counting frequency and which is arranged to have its counting time prescribed by said timing circuit (85,88), and furthermore, is arranged so that its count result is transferable through a gate stage (113) to said data bus (14), and*

*a frequency selection decoder stage (119) and a frequency selecting circuit (117) controlled through said frequency selection decoder stage in response to an output (74) of said decoding circuit (100), whereby said predetermined counting frequency is subject to being varied over said data bus.*

*17. An input-output unit for an operation control system containing a microprocessor, as defined in claim 16, in which the frequency selection circuit (117, 116) is constituted by a frequency divider stage (115) provided for operation at a base counting frequency and producing therefrom a plurality of output frequencies, and a transfer switching device (116,117) provided for selection among said output frequencies of said frequency divider stage (115) in response to said output (74) of said decoding circuit (100).*

*18. An input-output unit for an operation control system containing a microprocessor, as defined in claim 16, further comprising:*

*means for producing, in response to operation of said machine, timed signals (E) respectively occurring in successive intervals between said signals of said control signal sequence (F);*

*a selectable multi-channel final stage array (75,76; 49,50) providing a plurality of output command channels, and*

*select logic circuits (72,73) for sequential preselection of said channels of said final stage array, said select logic circuits being connected to said data bus for their control and to said final stage array for channel preselection in response to a signal of said control signal sequence (F) and including circuits for transferring said timed signals (E) to the channels preselected in sequence.*

*19. An input-output unit for an operation control system containing a microprocessor, as defined in claim 18, in which the frequency selection circuit (117,116) is constituted by a frequency divider stage (115) provided for operation at a base counting frequency and producing therefrom a plurality of output frequencies, and a transfer switching device (116,117) provided for selection among said output frequencies of said frequency divider stage (115) in response to said output (74) of said decoding circuit (100).*

* * * * *